United States Patent [19]

DeCaro

[11] 4,182,216
[45] Jan. 8, 1980

[54] COLLAPSIBLE THREADED INSERT DEVICE FOR PLASTIC WORKPIECES

[75] Inventor: Charles J. DeCaro, Marshfield, Mass.

[73] Assignee: Textron, Inc., Providence, R.I.

[21] Appl. No.: 882,919

[22] Filed: Mar. 2, 1978

[51] Int. Cl.² .......................................... F16B 13/06
[52] U.S. Cl. .................................. 85/70; 151/41.72; 403/252
[58] Field of Search .................. 85/70, 71, 72, 82, 83; 151/41.72, 41.74; 403/248, 388, 405, 408, 252

[56] References Cited

U.S. PATENT DOCUMENTS

| | | | |
|---|---|---|---|
| 2,018,251 | 10/1935 | Croessant | 85/71 |
| 2,148,977 | 2/1939 | Buck | 85/71 |
| 2,763,314 | 9/1956 | Gill | 85/70 |
| 2,887,926 | 5/1959 | Edwards | 85/70 |
| 3,128,813 | 4/1964 | Davis et al. | 85/70 |
| 3,257,889 | 6/1966 | Fischer | 85/70 |
| 3,512,328 | 5/1970 | Eriksson | 85/70 X |
| 3,686,914 | 8/1972 | Powsey | 85/70 X |
| 4,036,098 | 7/1977 | Schruff | 85/70 |

FOREIGN PATENT DOCUMENTS

| | | | |
|---|---|---|---|
| 2350954 | 4/1974 | Fed. Rep. of Germany | 85/70 |
| 2302441 | 9/1976 | France | 85/70 |

*Primary Examiner*—Rodney H. Bonck
*Attorney, Agent, or Firm*—Webb, Burden, Robinson & Webb

[57] ABSTRACT

An improved collapsible threaded anchoring device for securing items to a plate-like workpiece is an insert having an upper head portion adapted to engage the working face of the workpiece, an annular cylindrical sidewall which is collapsible and adjacent to the head portion, and a threaded shank portion. The head portion, the collapsible sidewall portion and the shank portion are integrally formed. The improved insert device is adapted for securing to a plastic plate-like workpiece. The improvement comprises a noncylindrical, noncollapsible collar having a cross-sectional width not less than the shank or sidewall portion and interposed between the head portion and the sidewall portion. The collar has an axial thickness slightly greater than the nominal thickness of the plastic workpiece.

9 Claims, 15 Drawing Figures

COLLAPSIBLE THREADED INSERT DEVICE FOR PLASTIC WORKPIECES

BACKGROUND OF THE INVENTION

1. Field of the Invention

This invention relates generally to self-locking, internally threaded anchoring devices and, more particularly, to threaded insert devices which are suitable for securement to plastic plate-like workpieces.

2. Description of the Prior Art

There are many instances during the fabrication of certain items wherein the use of the standard nut and bolt arrangement is prohibited, and where the thickness of the workpiece is inadequate for threading. For example, such is the case where the fastener must be attached in a blind hole, where the confines of the fabricated structure are such that it is impossible to gain access to the rear side of a bolt hole or where a component has to be attached to a thin sectioned workpiece.

A frequently used type of internally threaded fastener for overcoming this problem has been the conventional collapsible threaded insert or blind self-locking anchoring nut. These conventional threaded insert devices are placed in a hole in the workpiece, which is generally thin gauge metal sheet or metal plate stock and then, with the use of a special tool, are collapsed. Structural components may then be mounted to the workpiece by means of a bolt or screw in conjunction with the threaded insert. Exemplary fasteners of this type are found in U.S. Pat. Nos. 3,304,830 and 3,750,525.

Many improvements have been provided with these inserts to decrease their tendency to rotate within the workpiece when excessive torque is applied to the bolt or screw. Several other improvements have been provided in the application of these threaded insert devices.

In the automotive industry plastic as a material of construction has been more extensively utilized due to weight considerations and total cost of the final product. With the recent emphasis on plastic materials of construction replacing metal, the collapsible threaded insert devices have proved, in some cases, unsatisfactory for particular uses.

When the conventional prior art fastener is used in connection with plastic plate-like workpieces, the collasping of the collapsible sidewall to sandwich the plastic between the head and collapsed sidewall sometimes causes cracking, particularly at the hole edge, due to the lack of ductility of the particular plastic material. Thus, fastening techniques and devices which have been acceptable and desirable for metal workpieces have such disadvantages when used in connection with plastic workpieces.

The invention provides a collapsible threaded fastener insert which is readily collapsible and attachable to plastic workpieces without the disadvantage of cracking and damaging the workpiece.

Further, the invention provides a collapsible threaded insert device for use in plastic material which prevents the rotation of the anchor insert within the workpiece thereby preventing excess torque from impeding the function of the fastener.

BRIEF DESCRIPTION OF THE INVENTION

An improved collapsible threaded anchoring device for securing items to a plate-like workpiece is an insert which can be installed from one side of a workpiece. The insert has an upper head portion adapted to engage the working face of the workpiece, an annular cylindrical sidewall which is collapsible and adjacent to the head portion, and a threaded shank portion adjacent the collapsible sidewall; the head portion, the sidewall portion and the shank portion are integrally formed. The improved insert device is adapted for securing to a plastic plate-like workpiece. The improvement comprises a noncylindrical, noncollapsible collar having a cross-sectional width not less than the shank and interposed between the head portion and the sidewall portion. The collar has an axial thickness slightly greater than the nominal thickness of the plastic workpiece.

A further embodiment of the invention is the provision of an integrally formed taper extending from the outer periphery of the collar and blending smoothly into the collapsible sidewall. Thus, as the fastener is initially collapsed, the taper prevents engagement at the edge of the hole and at the final collapsing stages the sidewall extends upwardly to marginally and tangentially contact the plastic workpiece in an area spaced from the hole, thereby preventing axial movement of the fastener relative to the workpiece.

The upper head portion may have a flange integrally preformed as the head or may be of hollow right circular cylindrical configuration. The preformed head in addition to maintaining the insert in the workpiece prior to setting, also absorbs most or all of the torque required to set the insert. In the case of the right circular cylindrical configuration, the head is generally formed during the collasping process, i.e., it is upset and expanded to form the annular head itself and the collar may include means to retain the insert in the hole prior to setting.

The noncylindrical collar is noncollapsible and integrally formed with the head portion and may be square, hexagonal, elliptical, rectangular, star-shaped or of any configuration other than round. It is necessary that the collar be noncylindrical so that when the collar is inserted in an opening in the workpiece complementing the configuration of the collar, it does not rotate when torque is applied via a threaded member inserted in the insert device.

At the end of the collar opposing the head is an annular cylindrical collaspible sidewall. This sidewall, when force is applied thereto by way of a special tool, collapses pulling the shank toward the head and expanding the sidewall beyond the periphery of the collar, thus limiting the axial travel of the insert to maintain the shoulder within the workpiece between the base of the head and the expanded collapsed sidewall. In the second embodiment of the invention, the collar is tapered from its outer periphery so as to blend smoothly into the sidewall. This taper provides excess material to prevent collasping at the hole and assure that the collapsed portion engages the workpiece marginally and in spaced relationship to the hole. It is also possible to provide an integral threaded mandrel for attachment from both ends of the insert.

BRIEF DESCRIPTION OF THE DRAWINGS

The invention will be further illustrated with its objects becoming apparent by referring to the accompanying drawings wherein.

DETAILED DESCRIPTION OF THE DRAWINGS

Figure 1:
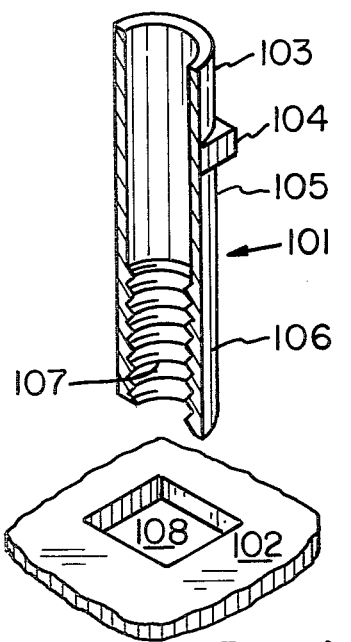
FIG. 1 is a perspective view partly in section of an upset head insert and plastic sheet with a hole for receiving the insert.
Figure 2:
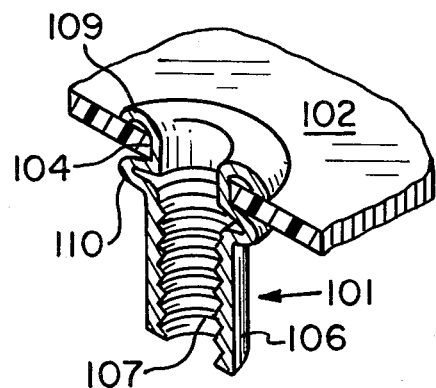
FIG. 2 is a perspective view partly in section showing the insert fastened in the plastic sheet.
Figure 3:
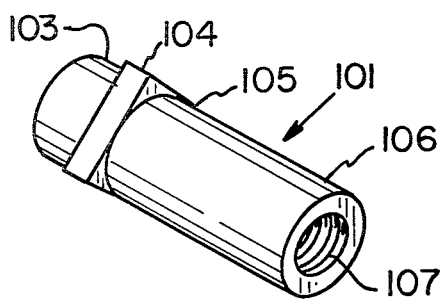
FIG. 3 is a perspective view of the insert shown in FIGS. 1 and 2.

Referring now to the drawings wherein like reference numerals correspond to like parts throughout with similar parts in various embodiments designated by primed numerals; FIGS. 1 through 3 show an insert, generally designated 101, particularly adapted for insertion in and fastening to a plastic sheet 102. The plastic sheet is typically composed of an acrylic, polycarbonate or the like polymeric material and the invention is particularly advantageous with use in connection with polymers having limited ductility.

The insert 101, which is hollow throughout, has a cylindrical head portion 103 which may be upset, (as will be hereinafter described) a collar 104, a collapsible annular sidewall 105 and a shank 106. The interior of the shank 106 has threads 107 adapted to receive a bolt, screw or the like threaded mandrel. The collar 104, which is square, extends perpendicular to the longitudinal axis of the insert 101 and is located between the collapsible annular sidewall 105 and the head portion 103. The collar 104 has a larger cross-sectional width than either the sidewall 105 prior to upsetting or shank 106, both of which would normally have the same outer diameter.

The axial length of the collar 104 is governed by the thickness of the particular plate-like plastic sheet 102. Theoretically, the axial length of the collar 104 and the thickness of the sheet 102 should be identical to achieve the maximum advantage of the invention. However, because of the normal variation in thickness of the plastic sheet 102, best results can practically be accomplished by having the axial length of the collar 104 slightly greater than the nominal thickness of the plastic sheet.

The selection of excess axial collar length over plastic sheet thickness is not an exact numerical value since the variation in plastic sheet thickness is governed by several known variables such as the nominal thickness of the sheet itself and the method of manufacture, e.g. hot mold, cold mold, etc. For example, if the nominal thickness of the plastic sheet is ⅛ inch the axial collar length should be 9/64 inch, while if the thickness of the plastic sheet is ¾ inch, the axial length of the collar should be about 25/32 inch. Thus, the axial length of the collar should be sufficiently greater than the nominal thickness of the sheet to allow the axial collar length to equal the maximum thickness of the plastic sheet.

Figure 4:
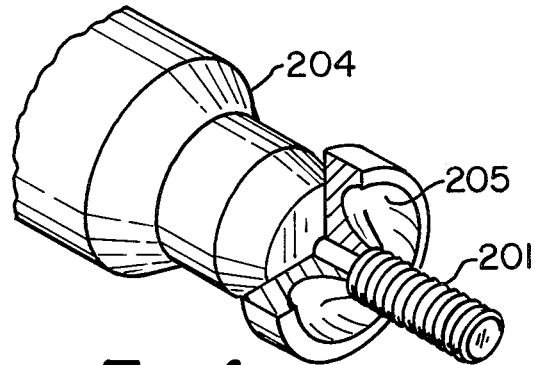
FIG. 4 is a perspective view of the tool used to collapse the insert and fasten it to the plastic sheet.

In operation, a hole 108 is formed in the plastic sheet 102 by stamping or a like method. The configuration of the hole 108 is adapted to receive the collar 104 of the fastener 101. The hole 108 is of the same configuration as the collar 104 and slightly larger. While a square hole and collar provide an optimum resistance to torquing, other noncircular configurations can be used. The insert 101 is threaded onto the mandrel 201 of an air tool 204 (shown in FIG. 4) until the head 103 abuts the die portion 205 of the setting anvil. The insert 101, mounted on the mandrel 201 is inserted into the hole 108 of the plastic sheet 102. The air tool 204 is activated and forms an upset head 109 and collapses the sidewall 105 to form a collapsed section 110, FIG. 2. The collapsed section 110 extends perpendicularly radially outward from the base of the collar 104. Thus, the collapsed section 110 does not compressively engage the plastic sheet 102 because of the collar 104.

The air tool 204 is disengaged from the insert 101 which is fixed in position on the plastic sheet 102, and bolts or screws may then be used to mount articles on the plastic sheet 108 via the threads 107. The engagement of the upset head 109 with the plastic 102 is radially outward from the radial extent of the collapsed section 110 to maximize the retention of the insert 101 to the plastic 102 during and after the article is attached. A particular advantage of the insert shown, and all of those in accordance with the invention, is that the collar 104 prevents rotation of the insert relative to the sheet when a screw or bolt is threaded therein while also minimizing compressive engagement of the head and collapsed section with the plastic which avoids damage to the plastic sheet.

Figure 5:
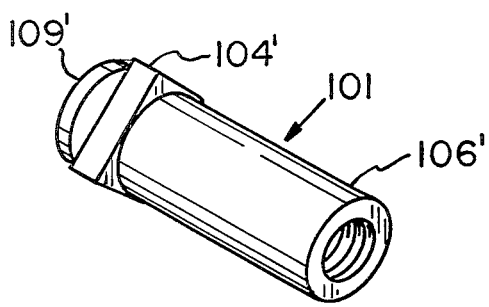
FIG. 5 is a perspective view of an insert with a preformed head.
Figure 6:
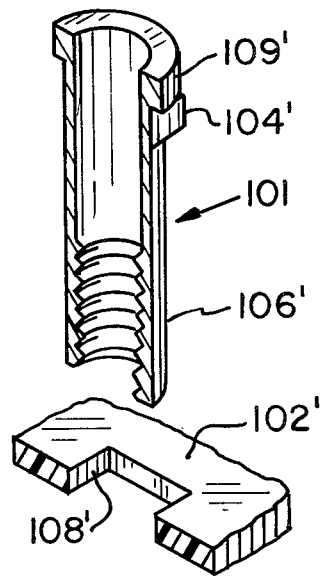
FIG. 6 is a perspective view partly in section of the insert of FIG. 5 and the plastic sheet with the mating hole therein.
Figure 7:
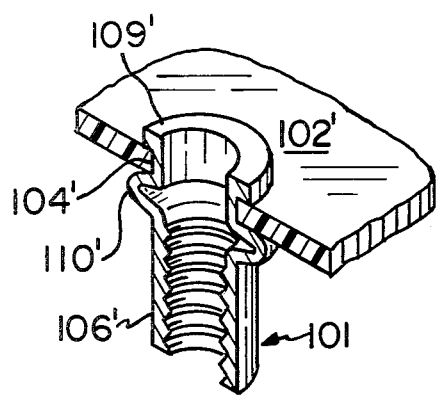
FIG. 7 is a sectional view partly in section showing the insert within the plastic sheet.

In FIGS. 5 through 7 an insert 101 is shown having a preformed head 109' thereon adjacent the collar 104'. The function and cooperation of the insert 101 with the plastic sheet 102' are identical to the embodiment shown in FIGS. 1 through 3 and differ only in the mounting method employed. The insert 101 is mounted on the mandrel of an air tool similar to that shown in FIG. 4, absent the dye, and processed and attached to form a collapsed section 110' adjacent the shank 106' in accordance with the procedure previously described in relation to FIGS. 1 through 3. The preformed head 109' maintains the collar 104' of the insert 101 in the square opening 108' of the plastic prior to setting and also absorbs the setting torque through its frictional contact with the anvil of the air tool.

Figure 8:
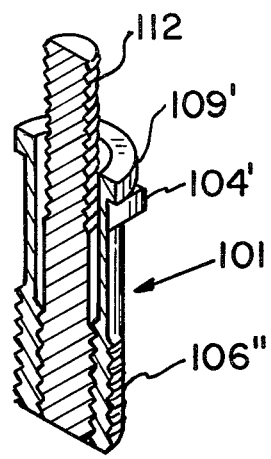
FIG. 8 is a perspective view partly in section of an insert with a threaded mandrel attached therein.
Figure 9:
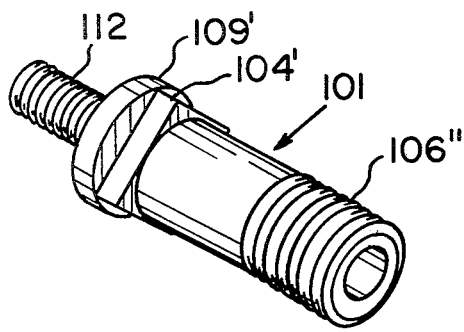
FIG. 9 is a perspective view of the insert of FIG. 8.

Referring now to FIGS. 8 and 9, an insert 101 has both an internally and externally threaded shank 106" provided for mounting of female threaded articles on the blind side of a workpiece (not shown). Further, a mandrel 112, threaded at both ends, can be mounted within the insert 101. Otherwise the insert 101 is similar to that illustrated in FIGS. 5 through 7. In mounting such an insert, the air tool described but not shown, used in connection with the fastener of FIGS. 5 through 7, can be used with the threaded mandrel 112 being mounted subsequent to the fastening of the insert 101" within the plastic workpiece. Alternatively, the threaded mandrel 112 may be mounted within the insert and attached to an air tool (not shown) which has a female receiving end for the mandrel 112. After mounting the mandrel 112 on the air tool, the insert 101 is fastened to the plastic sheet in the same manner as previously described but the insert includes a threaded male member which can be used to fasten another member to the plastic by means of internal threads or a nut.

Figure 10:
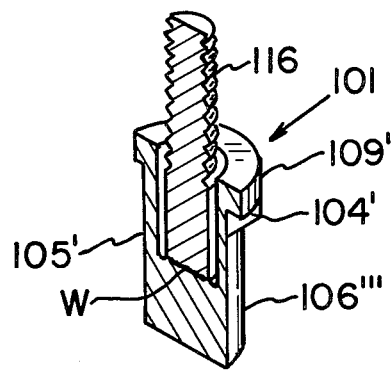
FIG. 10 is a perspective view partly in section of an insert with a mandrel formed integrally therein.
Figure 11:
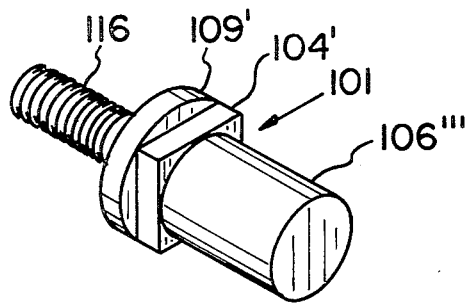
FIG. 11 is a perspective view of the insert of FIG. 10.

In yet another embodiment of the invention shown in FIGS. 10 and 11, an insert 101 is shown having a mandrel 116 extending outwardly from the fastener head 109' which in turn is adjacent collar 104'. The mandrel 116 is integrally formed within the shank 106''', which formation can also take place by inertia welding the mandrel 116 to the solid interior of shank 106''' so as to form weld zone W. The insert 101 is fastened to the workpiece in the alternative method described for the fastening of the inserts shown in FIGS. 8 and 9 with the collapsing taking place at sidewall 105'.

Figure 12:
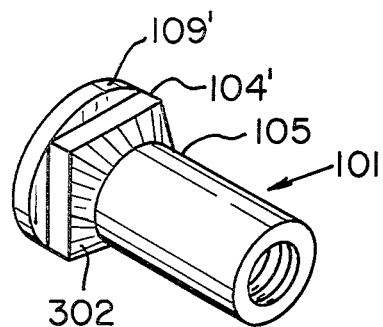
FIG. 12 is a perspective view of an insert having a preformed head and a collar including a tapered section.
Figure 13:
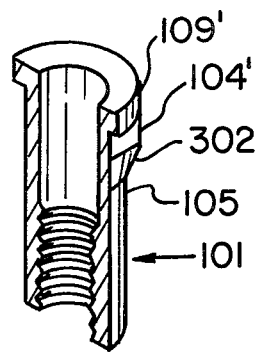
FIG. 13 is a perspective view partly in section of the insert of FIG. 12.
Figure 14:
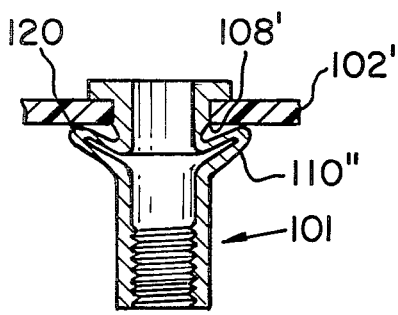
FIG. 14 is a cross section of the insert of FIGS. 12 and 13 fastened to the plastic sheet.

Referring now to FIGS. 12 through 14, a variation of the invention is shown. The embodiments previously described functioned to avoid compressive engaging force of the fastener head and the collapsed section with the plastic sheet by the interposing of the collar. However, since the collar 104, 104' is axially longer than the thickness of the plastic sheet 102, 102', after the fastening of the insert 101 to the sheet, some axial movement of the insert 101 in relation to the plastic sheet 102, 102' may be encountered. When such axial movement is either unacceptable or undesirable in a particular application, the variation of the invention shown in FIGS. 12 through 14 is used.

The collar 104' adjacent the preformed head 109' is configured as a square as in the earlier embodiments. However, a generally conical tapered section 302 extends from the periphery of the collar 104' and smoothly blends into the collapsible sidewall 105. This tapered section 302 provides excess material so that when sidewall 105 is collapsed, the collapsed section 110'' does not engage the edge of the hole 108' in the plastic sheet 102' and the engagement is at a location 120 which is radially outward from the hole 108'. The contact with the plastic sheet is also marginal and imparts minimal compressive force to the plastic sheet. Further, the contact of the collapsed section 110'' with the plastic sheet is tangential rather than planar so that any compressive force exerted on the plastic is minimal and tends to deflect the collapsed section 110''.

A comparison of FIGS. 14 and 7 illustrates the difference between the collapsible section perpendicular to the base of the collar (shown in FIGS. 1-3, and 5-11) and the collapsed section adjacent the tapered section (FIGS. 12 and 13). The perpendicular section 110' extends radially outwardly substantially parallel with the plastic sheet so as to sometimes leave a space between the plastic sheet and the collapsed sleeve. Thus, there may be axial relative movement between the insert and the plastic. In FIG. 14, as a result of the tapered sleeve 302, the collapsed section 110'' extends radially outwardly from the collar 104' and upwardly therefrom so as to engage the plastic sheet 102' to prevent axial movements of the insert 101. Further, it is to be understood that any of the previous embodiments may be modified to be provided with the tapered section.

Figure 15:
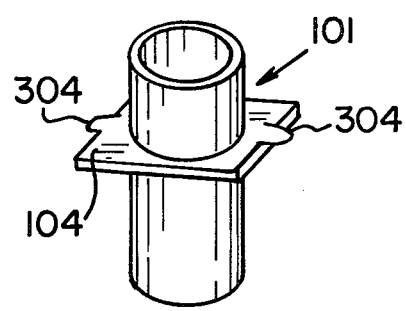
FIG. 15 is a perspective view of an upset head insert including retaining means on the collar.

In FIG. 15 an insert 101 is illustrated similar to the upset head type insert of FIGS. 1-3. However, a pair of tabs 304 are provided extending outward from the upper surface of the collar 104 a short distance. These tabs 304 keep the insert 101 from falling through the hole and also properly position the collar 104 with respect to the hole in the plastic sheet. Other forms of retention means can be employed to accomplish the same thing.

I claim:

1. An improved collapsible insert device for securing items to a plate-like workpiece which has an opening therein adapted to receive said insert device, said insert having an upper head portion adapted to engage the working face of the workpiece, an annular sidewall which is collapsible and adjacent to said head portion, and a shank portion coaxially extending from the sidewall, said head portion, said sidewall and shank portions being integrally formed, wherein the improved insert device is adapted for securing to a plastic, plate-like workpiece, the improvement comprising a noncylindrical, noncollapsible collar having a cross-sectional width not less than said shank and interposed between said head portion and said sidewall, an integrally formed noncollapsible tapered section extending from the outer periphery of said collar to the sidewall, said collar having an axial thickness slightly greater than that of said plastic workpiece and a cross-sectional width less than the cross-sectional width of said opening in said plastic, plate-like workpiece, and said sidewall being collapsible to form a workpiece engaging annular edge which is radially outward from the opening when the sidewall is in a collapsed condition.

2. The improvement of claim 1, said taper being substantially conical.

3. The improvement of claim 1, said collar having a substantially square configuration.

4. The improvement of claim 1 including a mandrel secured to an interior of the shank portion and extending outward from the head portion.

5. The improvement of claim 4, said shank portion being internally and externally threaded and said mandrel threadably engaging said internally threaded shank portion.

6. The improvement of claim 4, said shank portion being solid and said mandrel connecting to said interior solid shank portion.

7. In the combination including a plate-like plastic workpiece having a nominal thickness and a noncylindrical opening therethrough, and a collapsible threaded insert device positioned within said opening, said insert including an annular upper head portion adapted to engage a first face of the workpiece, an annular sidewall which is collapsible and adjacent a second face of the workpiece and a shank coaxially extending from said sidewall, said head portion, said sidewall and said shank being integrally formed, the improvement comprising; a noncylindrical, noncollapsible collar matingly configured with said opening and positioned therein, said collar having a cross-sectional width not less than said shank and interposed between said head portion and said sidewall, said collar having an axial thickness slightly greater than said nominal thickness and the cross-sectional width less than the cross-sectional width of said opening in said plastic plate-like workpiece, an integrally formed tapered section extending from the outer periphery of said collar, said sidewall being collapsible to form a workpiece engaging annular edge, said edge being radially outward from said opening when said sidewall is in a collapsed condition.

8. The combination of claim 7 said annular upper head portion being a preformed head.

9. The combination of claim 7 said annular upper head portion being cylindrical and collapsible into engagement with said first face.

* * * * *